(12) United States Patent
Weihrauch

(10) Patent No.: US 7,095,152 B2
(45) Date of Patent: Aug. 22, 2006

(54) STATOR FOR A LINE-START ELECTRIC MOTOR

(75) Inventor: Niels Christian Weihrauch, Flensburg (DE)

(73) Assignee: Danfoss Compressors GmbH, Flensburg (DE)

( * ) Notice: Subject to any disclaimer, the term of this patent is extended or adjusted under 35 U.S.C. 154(b) by 0 days.

(21) Appl. No.: 11/068,808

(22) Filed: Feb. 28, 2005

(65) Prior Publication Data

US 2005/0218748 A1    Oct. 6, 2005

(30) Foreign Application Priority Data

Mar. 2, 2004    (DE) .................... 10 2004 011 748

(51) Int. Cl.
*H02K 1/12* (2006.01)

(52) U.S. Cl. ..................................... 310/254

(58) Field of Classification Search .............. 310/254, 310/216, 258, 259, 167, 168
See application file for complete search history.

(56) References Cited

U.S. PATENT DOCUMENTS

| | | | |
|---|---|---|---|
| 5,927,249 A * | 7/1999 | Ackermann et al. | 123/399 |
| 6,005,321 A * | 12/1999 | Bolton et al. | 310/168 |
| 6,329,729 B1 * | 12/2001 | Sakamoto | 310/49 R |
| 6,844,652 B1 * | 1/2005 | Chu et al. | 310/216 |

FOREIGN PATENT DOCUMENTS

| | | |
|---|---|---|
| DE | 1 012 681 | 7/1957 |
| DE | 34 04 960 A1 | 8/1985 |
| EP | 0 809 343 A1 | 11/1997 |

* cited by examiner

*Primary Examiner*—Darren Schuberg
*Assistant Examiner*—Nguyen Hanh
(74) *Attorney, Agent, or Firm*—McCormick, Paulding & Huber LLP

(57) ABSTRACT

The invention concerns a stator for a line-start electric motor, with a rotor accommodating chamber, in which a rotor is accommodated to be rotatable, and which has accommodating chambers for conducting rods and accommodating chambers for permanent magnets, and with a stator winding comprising several windings, which, during operation of the line-start electric motor under the influence of the rotor, generate a magnetic field with a main axis. In order to increase the efficiency of the line-start electric motor, the rotor accommodating chamber has no constant inner radius, but, in the area of a vertical to the main axis, has a larger inner radius than in the adjacent areas.

17 Claims, 5 Drawing Sheets

STATOR FOR A LINE-START ELECTRIC MOTOR

CROSS-REFERENCE TO RELATED APPLICATIONS

Applicant hereby claims foreign priority benefits under U.S.C. § 119 from German Patent Application No. 10 2004 011 748.9, filed Mar. 2, 2004 the contents of which are incorporated by reference herein.

FIELD OF THE INVENTION

The invention concerns a stator for a line-start electric motor.

BACKGROUND OF THE INVENTION

With traditional line-start electric motors, the windings of the stator windings are distributed on the complete stator circumference. The windings are made of copper wire. During operation, the copper comprised in the copper wire causes a so-called copper loss, which has a negative effect on the efficiency of the line-start electric motor.

SUMMARY OF THE INVENTION

It is the task of the invention to provide a stator for a line-start electric motor through which the efficiency of the line-start electric motor can be increased.

With a stator for a line-start electric motor, with a rotor accommodating chamber, in which a rotor is accommodated to be rotatable, and which has accommodating chambers for conducting rods and permanent magnets, and with a stator winding comprising several windings, which generate a magnetic field with a main axis, this task is solved in that the rotor accommodating chamber has no constant inner radius, but, in the area of a vertical to the main axis, has a larger inner radius than in the adjacent areas. During operation of the line-start electric motor, the interaction of rotor and stator will generate a rotating field. Through a concentration of at least a share of the windings of the stator winding in the area of a vertical to the main axis, the copper amount required for the windings can be reduced. The rotating field looses its usual sine shape and instead extends in a substantially square shape. This substantially square course of the magneto-motoric force is connected with the formation of a large amount of strongly pronounced harmonics, which have a negative effect on the efficiency of the line-start electric motor. The variation of the inner diameter of the rotor accommodating chamber can reduce the amplitude of the harmonic frequency in comparison with a circular rotor accommodating chamber, which has a positive effect on the efficiency of the line-start electric motor. Due to the magnetisation of the rotor magnets, the extended air gap between rotor and stator has no negative effect on the efficiency.

With a stator for a line-start electric motor, with a rotor accommodating chamber, in which a rotor is accommodated to be rotatable, and which has accommodating chambers for conducting rods and permanent magnets, and with a main stator winding comprising several windings and generating a magnetic field with a main axis, which is arranged to be vertical to an auxiliary axis of a magnetic field, which is generated by an auxiliary stator winding comprising several windings, the task is solved in that the rotor accommodating chamber has no constant inner radius, but, in the areas between the main axis and the auxiliary axis has a larger inner radius than in the adjacent areas. During operation of the line-start electric motor, the interaction of rotor and stator generates a rotating field. Through a concentration of at least a share of the windings of the stator windings in the area of the main axis and the auxiliary axis, the copper amount required for the windings can be reduced. However, the rotating field looses it usual sine shape and instead assumes an approximately square shape.

This substantially square course of the magneto-motoric force is connected with the formation of a large amount of strongly pronounced harmonics, which have a negative effect on the efficiency of the line-start electric motor. The variation of the inner diameter of the rotor accommodating chamber can reduce the amplitude of the harmonic frequency compared with a circular rotor accommodating chamber, which has a positive effect on the efficiency of a line-start electric motor. Due to the magnetisation of the rotor magnets, the extended air gap between rotor and stator has no negative effect on the efficiency.

A preferred embodiment of the stator is characterised in that the main stator winding has several windings, which are concentrated near the auxiliary axis and in that the auxiliary stator winding comprises several windings, which are concentrated near the main axis.

A further, preferred embodiment of the stator is characterised in that at least a share of the windings of a stator winding is concentrated in two diametrically opposite winding accommodating areas of the stator.

A further, preferred embodiment of the stator is characterised in that at least a share of the windings of a stator winding extends through several stator winding accommodating chambers located diametrically in pairs, no stator winding accommodating chambers being without a portion of the windings. Preferably, the number of stator winding accommodating chambers is limited to four, six, eight or ten. However, in the extreme case, also only two stator winding accommodating chambers can be located diametrically opposite each other.

A further, preferred embodiment of the stator is characterised in that a plurality of accommodating chambers is distributed evenly on the circumference of the stator, accommodating chambers without windings being located between the stator winding accommodating chambers. Alternatively, the empty accommodating chambers can be omitted.

A further, preferred embodiment of the stator is characterised in that the size of the stator winding accommodating chambers is adapted to the number of windings comprised. This causes that accommodating chambers with many windings have a larger cross-section than accommodating chambers with only a few or even no windings.

A further, preferred embodiment of the stator is characterised in that the inner circumference of the rotor accommodating chamber, seen in a cross-section, is substantially so corrugated that the magnetic field generated during operation has a substantially sine-shaped course. Thus, it is possible, in spite of the winding concentration in one or more accommodating chambers, to achieve a substantially sine-shaped course of the magneto-motoric force during operation of the line-start electric motor.

A further, preferred embodiment of the stator is characterised in that the radius of the rotor accommodating chamber varies by 0.5 to 2%, particularly by 1.5 to 1.7%. These values have proved to be particularly advantageous within the scope of the present invention.

With a line-start electric motor with a stator, in which is provided a rotor accommodating chamber, in which a rotor is arranged to be rotatable, and which comprises accommodating chambers for conducting rods and accommodating chambers for permanent magnets, the task described above is solved by the use of a stator as described above.

BRIEF DESCRIPTION OF THE DRAWINGS

Further advantages, features and details of the invention appear from the following description, in which different embodiments are described in detail with reference to the drawings. In this connection, the features mentioned in the claims and in the description can be essential for the invention both individually and in random combinations. The drawings show:

DETAILED DESCRIPTION OF THE PREFERRED EMBODIMENTS

A traditional stator of a line-start electric motor comprises a plurality of windings of a stator winding or of several stator windings.

Figure 1:
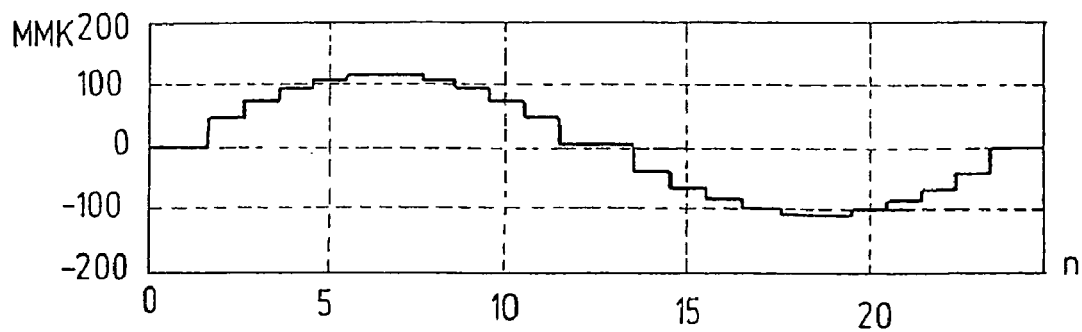
FIG. 1 is a graph showing distribution of the magneto-motoric force over the slots with a substantially sine-shaped winding distribution.

The stator is made of several stator sheets, which are substantially shaped as annulus discs. The accommodating chambers for the windings are open inside and are therefore also called slots. The windings are made of copper wire and distributed in the individual slots in different numbers. The distribution of the windings per slot usually follows the rule of a sine distribution. Thus, it is achieved that the rotating field resulting from the interaction of stator and rotor during operation of the line-start electric motor has an approximately sine-shaped course, when, as shown in FIG. 1, the magneto-motoric force MMK is distributed over the slots. In FIG. 1, the magneto-motoric force is distributed over the slots 1 to 24.

Figure 2:
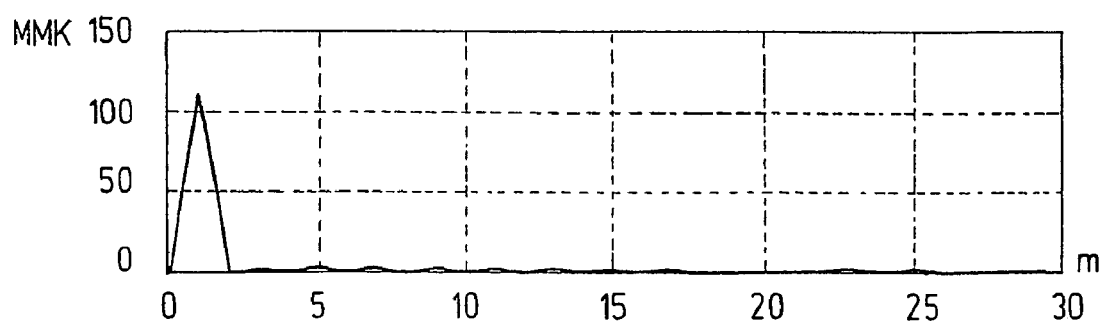
FIG. 2 is a graph showing distribution of the magneto-motoric force over the sequence of the harmonics of the winding distribution shown in FIG. 1.
Figure 3:
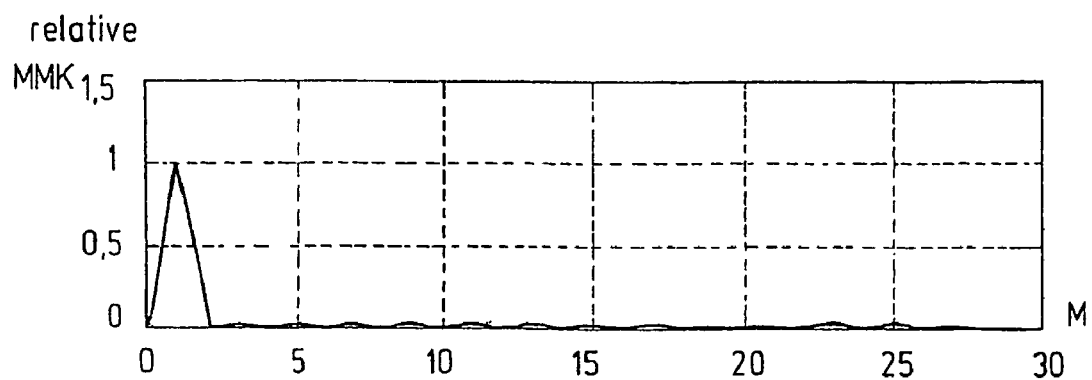
FIG. 3 is a graph showing distribution of the relative magneto-motoric force over the sequence of the harmonics of the winding distribution shown in FIG. 1.

In the FIGS. 2 and 3, the magneto-motoric force MMK or the relative magneto-motoric force, respectively, distributed over the sequence of the harmonics 1 to 30. From the FIGS. 2 and 3 it appears that with a substantially sine-shaped distribution of the winding wires a large first harmonic occurs, whereas the particularly critical third harmonic as well as the fifth and the seventh harmonics are only weakly pronounced.

The copper comprised in the winding wires causes a copper loss, which reduces the efficiency of the line-start electric motor. When a reduction of the copper amount comprised in the stator was possible, the efficiency of the line-start electric motor would increase. Within the scope of the present invention it has been established that the copper amount comprised in the stator can be reduced, in that the concentration of the copper wires in some slots is increased. A line-start motor supplies the same torque, when, for example, the copper wires are distributed over four slots instead of over five slots. Through the concentration increase of the winding wires, the magnetic poles in the stator are concentrated. However, when concentrating the winding wires in a smaller number of slots, the rotating field will lose its sine-shape to become approximately square.

Figure 4:
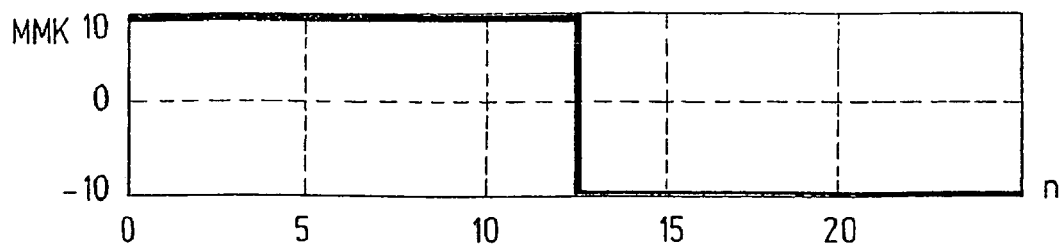
FIG. 4 is a graph showing distribution of the magneto-motoric force over the slots, the windings being located in only two diametrically arranged slots.
Figure 5:
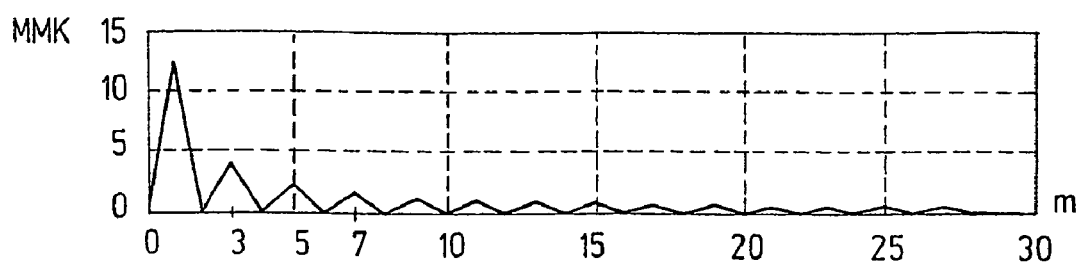
FIG. 5 is a graph showing distribution of the magneto-motoric force over the sequence of the harmonics of the winding distribution shown in FIG. 4.
Figure 6:
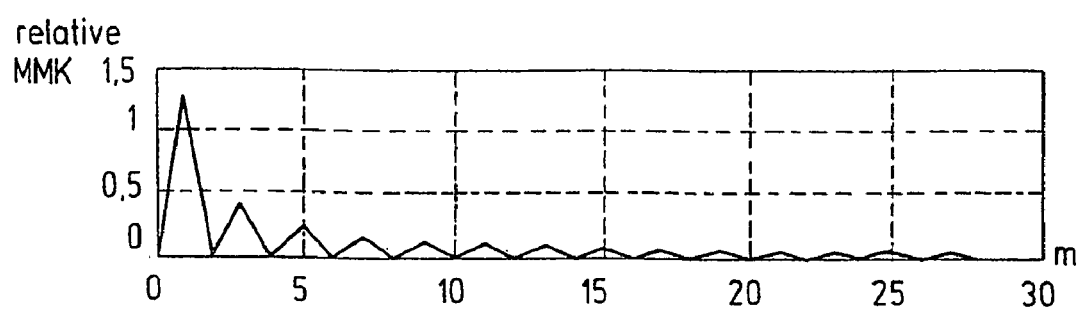
FIG. 6 is a graph showing distribution of the relative magneto-motoric force over the sequence of the harmonics of the winding distribution shown in FIG. 4.

In the diagrams shown in the FIGS. 4 to 6, the copper winding wires are distributed on only two slots, which are located to be diametrically displaced, that is, by 180°, in relation to each other. The course of the magneto-motoric force MMK over the slots 1 to 24 is square. From the slots 1 to 12, the magneto-motoric force MMK has a value of plus 10 and then drops to minus 10. From the slots 12 to 24 the magneto-motoric force MMK has the value minus 10.

The FIGS. 5 and 6 show the result of a Fourier analysis. The distribution of the magneto-motoric force over the harmonics shows that particularly the third, fifth and seventh harmonic have a rather high value, which causes an unacceptable reduction of the efficiency.

Through the design of the stator in accordance with the invention, the copper amount in the stator can be reduced, which at the same time reduces the reducing influence of the harmonics or the harmonic frequencies, respectively, on the efficiency.

Figure 7:
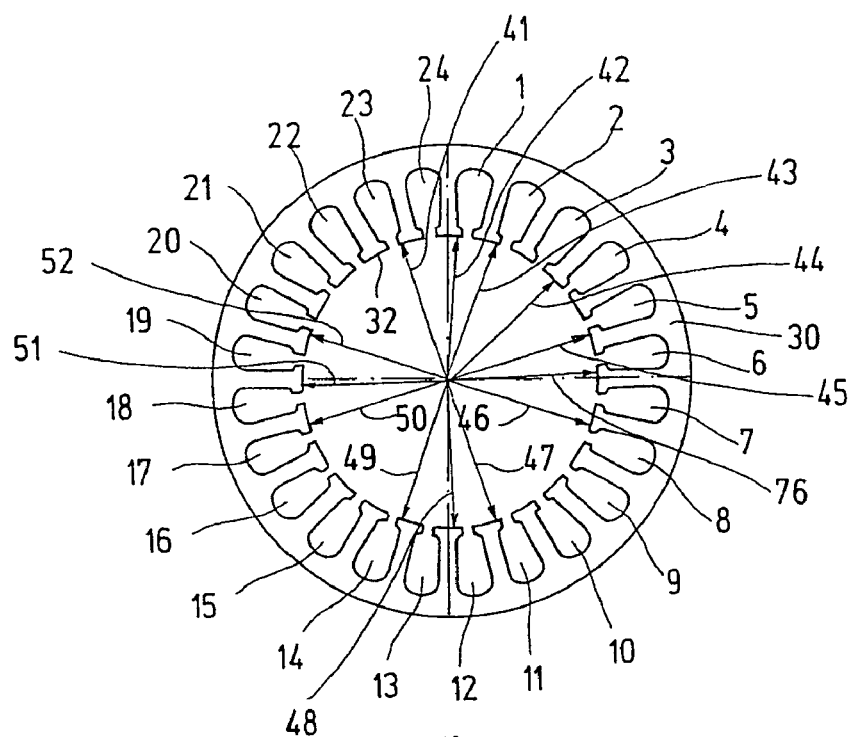
FIG. 7 is a cross-section of a stator sheet according to the present invention.

FIG. 7 shows a cross-section of a stator sheet. The stator sheet substantially has the shape of an annulus disc, in which a plurality of slots 1 to 24 are undercut, which are open on the radial inside. In the stator sheet 30 is formed a rotor accommodating chamber, which substantially has an annular shape. However, the inner radius of the rotor accommodating chamber 32 is not constant. The rotor accommodating chamber has a plurality of different radii 41 to 52.

Figure 8:
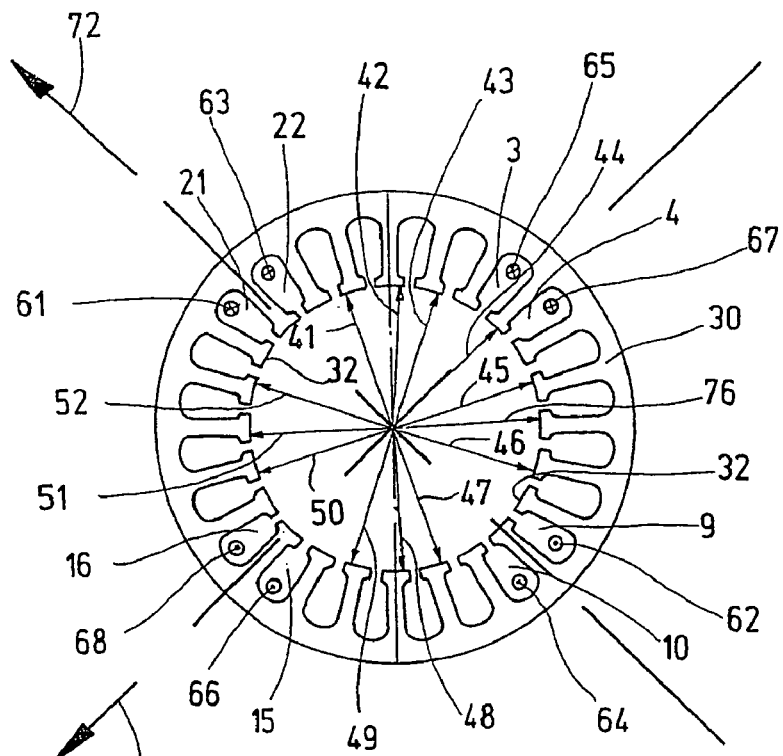
FIG. 8 is the stator sheet of FIG. 7 with a main stator winding and an auxiliary stator winding.

In FIG. 8, some of the slots accommodate windings of a main winding and an auxiliary winding. In the embodiment according to FIG. 8, the main winding comprises two windings, which enter the drawing level at 61 and 63 in the slots 21 and 22 and leave the drawing level at 62 and 64 in the slots 9 and 10. During operation of the line-start electric motor, the windings 61 to 64 of the main winding generate a magnetic field, whose main axis is called 71. The auxiliary winding comprises two windings, which enter the drawing level at 65 and 67 in the slots 3 and 4 and leave the drawing level at 66, 68 in the slots 15, 16. During operation of the line-start electric motor, the windings 65 to 68 of the auxiliary winding generate a magnetic field, whose auxiliary axis is called 72. The auxiliary axis 72 is arranged to be vertical to the main axis 71.

In FIG. 8 it can be seen that the two windings 61 to 64 of the main winding are distributed on four slots 21, 22, 9, 10, which are arranged in pairs diametrically opposite each other. The two windings 65 to 68 of the auxiliary winding are distributed on four slots 3, 4, 15, 16, which are arranged in pairs diametrically opposite each other. The remaining slots accommodate no windings.

In the area of the slots 3, 4, 9, 10, 15, 16 and 21, 22, in which windings 61 to 68 of the main winding and the auxiliary winding are located, the radius of the rotor accommodating chamber 32 is smaller than in the neighbouring areas. The slots, in which the windings 61 to 68 are located, are also called stator winding accommodating chambers or stator winding accommodating slots 3, 4, 9, 10, 15, 16, 21, 22. In the area of the stator winding accommodating slots, the radius 44 of the rotor accommodating chamber 32 has a value of 31.52 mm. At 41, 43, 45, 46, 47, 49, 50 and 52, the radius of the rotor accommodating chamber 32 has a value of 31.7 mm. At 42, 76, 48 and 51, the radius of the rotor accommodating chamber 32 has a value of 32 mm.

Thus, the radius of the rotor accommodating chamber 32 is smallest in the area of the stator winding accommodating slots, and then increases steadily in the area of the empty slots, up to the angle halvings between the main axis and the auxiliary axis. The size of the radius of the rotor accommodating chamber 32 varies substantially in a wave-shape between the stator winding accommodating slots of the different windings, to achieve a substantially sine-shaped course of the magnetic field occurring during operation. Thus, the amplitude of the harmonic frequencies can be reduced in relation to a stator with a constant inner radius. The varying radius causes a reduction of the magnetic field in the air gap between stator and rotor, where the radius is largest.

When the stator shown in FIG. 8 would only have one stator winding, for example, the main stator winding with the windings 61 to 64, the radius of the rotor accommodating chamber 32 would be largest in the area of the main stator winding accommodating slots 9, 10; 21, 22, and would decrease steadily in the area of the empty slots. The largest radius of 32 mm of the rotor accommodating chamber 32 would then be in the areas, in which the largest copper concentration of the stator would be.

Figure 9:
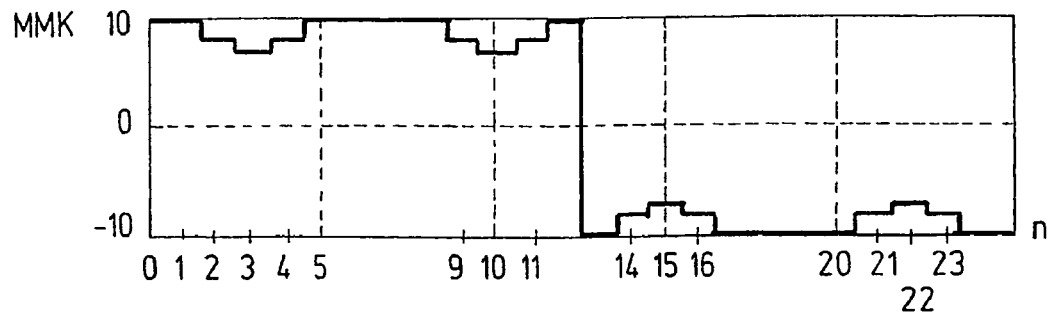
FIG. 9 is a graph showing distribution of the magneto-motoric force over the slots analogue to FIG. 4, the inner diameter of the stator in the area of twelve slots having a larger radius than in the area of the remaining slots.

FIG. 9 shows the magneto-motoric force over the slots 1 to 24 of a stator. In the area of the slots 1, 5 to 8, 13, 17 to 20 and 24, the inner rotor chamber of the stator has a radius of 32 mm. In the area of the slots 2, 4, 9, 11, 14, 16, 21, 23, the radius of the rotor accommodating chamber has a value of 31.7 mm. In the area of the slots 3, 10, 15, 22, the radius of the radiator accommodating chamber has a value of 31.52 mm. In the slots with a radius of 32 mm no windings of the main and the auxiliary windings are arranged. In the remaining slots, windings are arranged.

Figure 10:
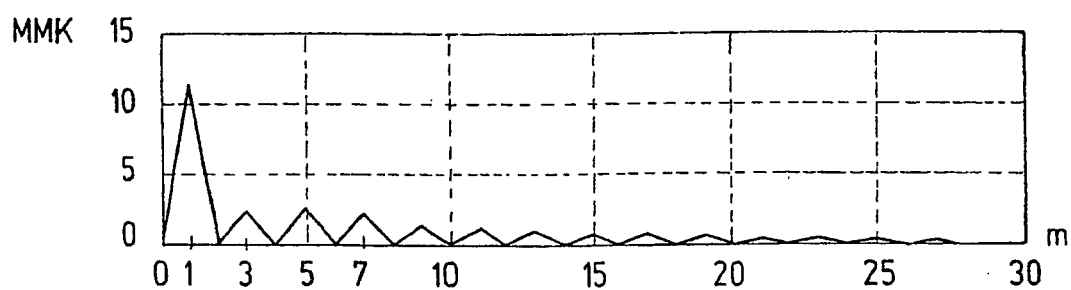
FIG. 10 is a graph showing distribution of the magneto-motoric force over the sequence of the harmonics of the embodiment according to FIG. 9.
Figure 11:
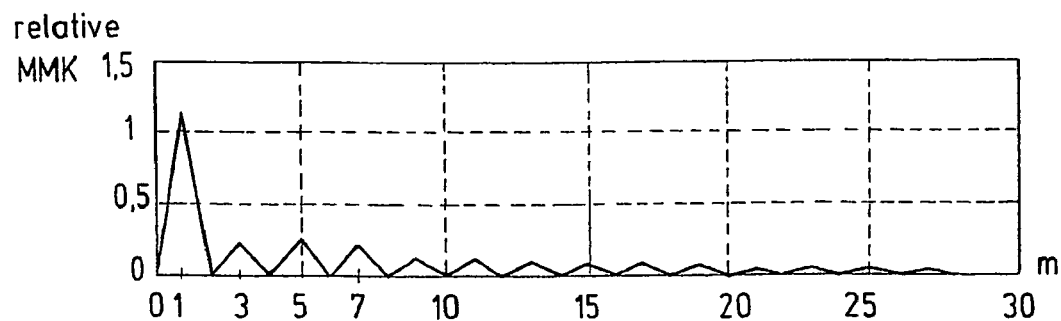
FIG. 11 is a graph showing distribution of the relative magneto-motoric force over the sequence of the harmonics of the embodiment according to FIG. 10.

From the FIGS. 10 and 11, it appears that particularly the size of the particularly critical third harmonics could be reduced by the distribution of the windings and by the varying inner rotor accommodating chamber diameter.

Figure 12:
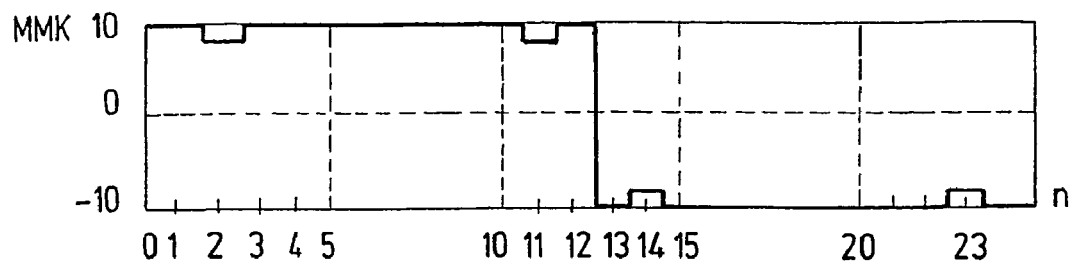
FIG. 12 is a graph showing distribution of the magneto-motoric force over the slots, the inner diameter of the rotor accommodating chamber having a larger radius in the area of four slots than in the area of the remaining slots.
Figure 13:
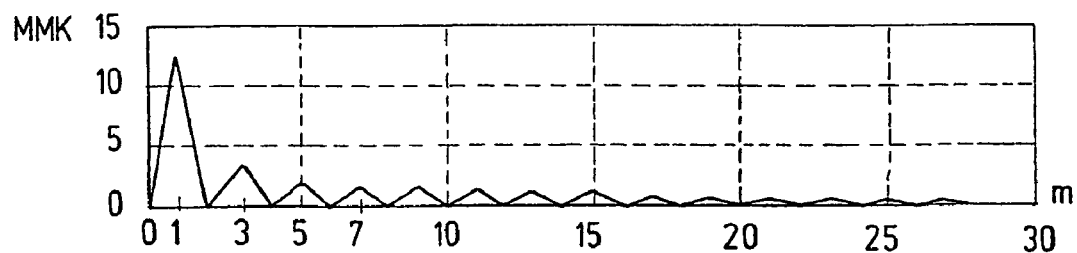
FIG. 13 is a graph showing distribution of the magneto-motoric force over the sequence of the harmonics of the embodiment according to FIG. 12.
Figure 14:
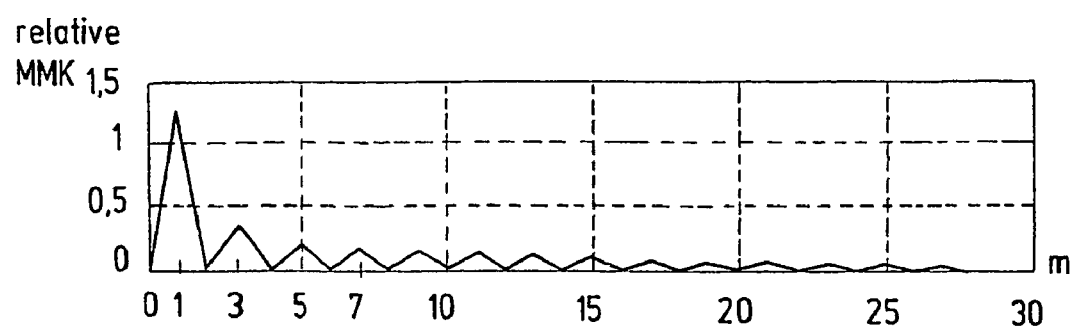
FIG. 14 is a graph showing distribution of the relative magneto-motoric force over the sequence of the harmonics of the embodiment according to FIG. 12.

The diagram in FIG. 12 refers to a stator, which only has a smaller radius in the area of the slots 2, 11, 14 and 23 than in the area of remaining slots. However, the FIGS. 13 and 14 show that the effect on particularly the third harmonics is then no longer as large as in the embodiment example above.

A solution with several different radii is preferred. Tests have shown that the differences of the radii of the rotor accommodating chamber must not be too large. Otherwise, they will have a negative effect on the efficiency of the line-start electric motor.

In the area between the slots, the inner rotor accommodating chamber radius can be constant, so that the inner radii of the slot interspaces, which are also called teeth, vary from tooth to tooth. However, it is also possible that the inner radius of a tooth is not constant, but varies.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A stator for a line-start electric motor, with a rotor accommodating chamber, and with a stator winding comprising several windings, which generate a magnetic field with a main axis, wherein the rotor accommodating chamber in the area of a vertical to the main axis, has a larger inner radius than in the adjacent areas, such that an amplitude of a harmonic frequency of a magneto-motoric force is reduced in comparison with a circular rotor accommodating chamber.

2. The stator according to claim 1, wherein at least a share of the windings of a stator winding is concentrated in two diametrically opposite winding accommodating areas of the stator.

3. The stator according to claim 1, wherein the windings of a stator winding extend through several stator winding accommodating chambers located diametrically in pairs, no stator winding accommodating chambers being without a portion of the windings.

4. The stator according to claim 1, wherein a plurality of accommodating chambers is distributed evenly on the circumference of the stator, accommodating chambers without windings being located between the stator winding accommodating chambers.

5. The stator according to claim 1, wherein the size of the stator winding accommodating chambers is adapted to the number of windings comprised.

6. The stator according to claim 1, wherein the inner circumference of the rotor accommodating chamber, seen in a cross-section, is substantially so corrugated that the magnetic field generated during operation has a substantially sine-shaped course.

7. The stator according to claim 1, wherein the radius of the rotor accommodating chamber varies by 0.5 to 2%.

8. The stator according to claim 1, wherein the radius of the rotor accommodating chamber varies by 1.5 to 1.7%.

9. A stator for a line-start electric motor, with a rotor accommodating chamber, and with a main stator winding comprising several windings and generating a magnetic field with a main axis, which is arranged to be vertical to an auxiliary axis of a magnetic field, which is generated by an auxiliary stator winding comprising several windings, wherein the rotor accommodating chamber in the areas between the main axis and the auxiliary axis has a larger inner radius than in the adjacent areas, such that an amplitude of a harmonic frequency of a magneto-motoric force is reduced in comparison with a circular rotor accommodating chamber.

10. The stator according to claim 9, wherein the main stator winding has several windings, which are concentrated near the auxiliary axis and in that the auxiliary stator winding comprises several windings, which are concentrated near the main axis.

11. The stator according to claim 9, wherein at least a share of the windings of a stator winding is concentrated in two diametrically opposite winding accommodating areas of the stator.

12. The stator according to claim 9, wherein the windings of a stator winding extend through several stator winding accommodating chambers located diametrically in pairs, no stator winding accommodating chambers being without a portion of the windings.

13. The stator according to claim 9, wherein a plurality of accommodating chambers is distributed evenly on the circumference of the stator, accommodating chambers without windings being located between the stator winding accommodating chambers.

14. The stator according to claim 9, wherein the size of the stator winding accommodating chambers is adapted to the number of windings comprised.

15. The stator according to claim 9, wherein the inner circumference of the rotor accommodating chamber, seen in a cross-section, is substantially so corrugated that the magnetic field generated during operation has a substantially sine-shaped course.

16. The stator according to claim 9, wherein the radius of the rotor accommodating chamber varies by 0.5 to 2%.

17. The stator according to claim 9, wherein the radius of the rotor accommodating chamber varies by 1.5 to 1.7%.

* * * * *